UNITED STATES PATENT OFFICE.

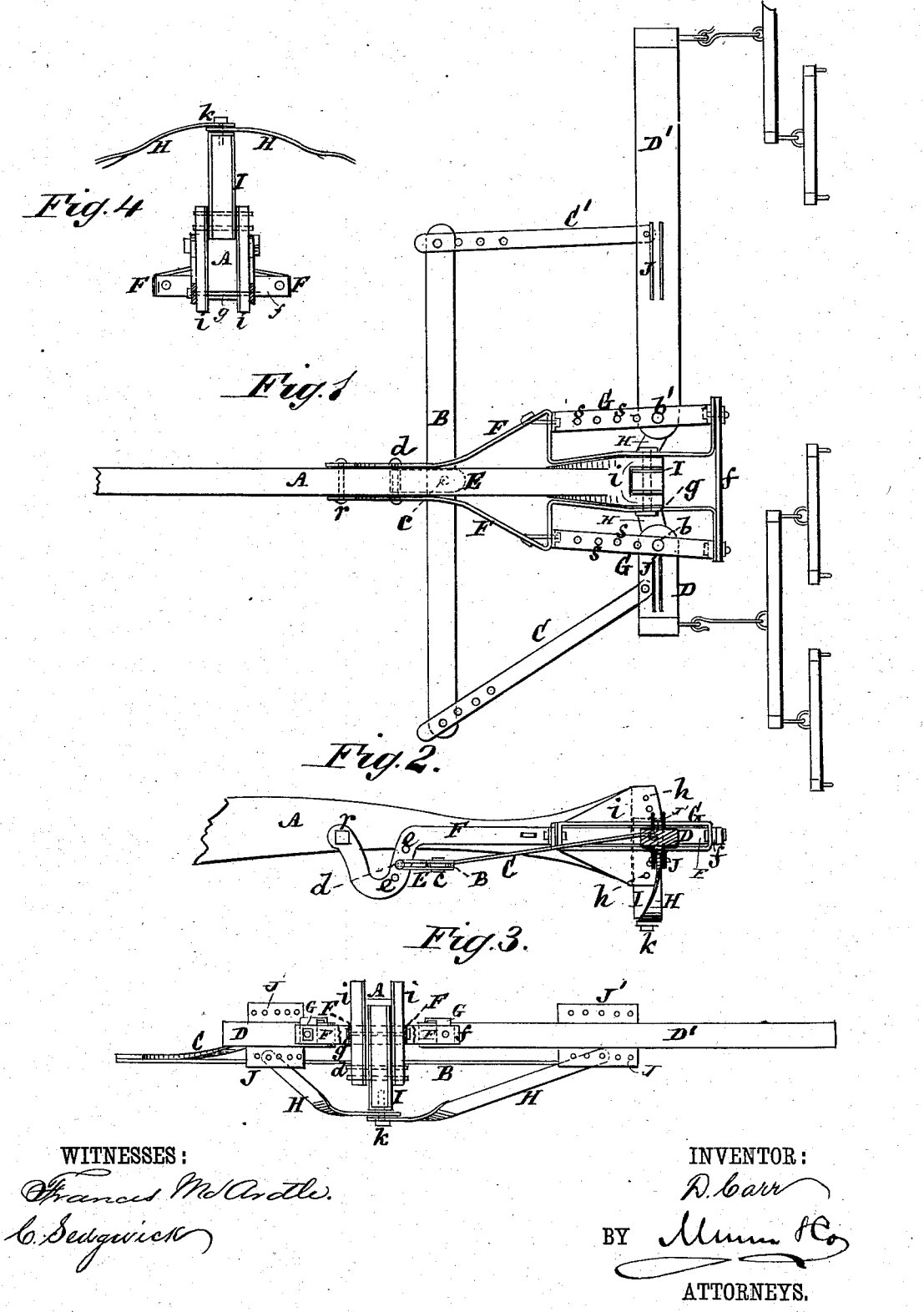

DALLAS CARR, OF CHANDLERVILLE, ILLINOIS.

DRAFT-EQUALIZER.

SPECIFICATION forming part of Letters Patent No. 258,372, dated May 23, 1882.

Application filed December 29, 1881. (Model.)

*To all whom it may concern:*

Be it known that I, DALLAS CARR, of Chandlerville, in the county of Cass and State of Illinois, have invented a new and useful Improvement in Draft-Equalizers for Sulky-Plows, of which the following is a full, clear, and exact description.

Reference is to be had to the accompanying drawings, forming part of this specification, in which similar letters of reference indicate corresponding parts in all the figures.

Figure 1 represents a plan view of my improved draft-equalizing devices in connection with the plow-beam of a sulky-plow; Fig. 2, a partly sectional side view of the same; Fig. 3, a front view thereof; and Fig. 4 is a partial front view, showing block I and attached braces in inverted position.

This invention is designed to be applied to a sulky-plow using four horses abreast. In using such plows it is necessary that each pair of horses should be at different distances from the plow-beam. Thus for a right-hand plow the right-hand pair of horses must be hitched much nearer to the beam than the left-hand pair; hence the necessity of equalizing the draft.

The invention consists in certain combinations of adjustable devices, including levers of different lengths, with which the pivoted cross-bar of the draft devices is connected on opposite sides of the plow-beam for the purpose of equalizing the draft by giving to the pair of horses which are nearest to the plow-beam the shortest working leverage and to the pair of horses which are farthest from the beam the longest leverage connection with the latter; also, whereby every provision is made for adjusting the plow to work at different depths, and other variations or requirements are met.

A is the plow-beam, and B the draft cross-bar, which is connected at its ends by bars C C' with the two levers D D', of unequal length, on opposite sides of the beam, for each pair of horses to transmit its draft through, the bars C C' being attached to their respective levers at different distances from their pivots or working centers $b\ b'$. By means of these separate levers of unequal length the draft of each pair of horses at different distances from the beam is equalized. The cross-bar B is not pivoted directly to the beam, but to a loop, E, at $c$, which loop is attached by a cross-pin, $d$, to side arms, F F, on opposite sides of the beam, said pin being passed through any one pair of a series of holes, $e\ e$, arranged one above the other in the side arms, F F, for a purpose that will be hereinafter described. These side arms, which are pivoted to the beam by a pin, $r$, are connected at their front ends by a cross-bar, $f$, outside of the levers D D', which latter have their fulcrums or pivots $b\ b'$ in any one pair of a series of holes, $s\ s$, made in looped straps G G, which are attached to the backs and forward bent portions of the side arms. Said side arms, F F, are further connected to the beam by a pin, $g$, passing through any one pair of a series of holes, $h$, arranged one above the other in the jaw end $i$ of the beam, so that by removing the pin $g$ the side arms, F F, with their several draft attachments, including the levers D D', may be raised or lowered, and be secured by passing the pin $g$ through any other pair of the holes $h$ to change the working depth of the plow.

The draft-equalizing levers D D' are supported by braces H H, which have a swivel-connection, $k$, at their inner ends to a stirrup, I, arranged to fit within the jaw end $i$ of the beam, in which it is secured by a pin passing through the holes in the jaw, and the latter and the stirrup made adjustable up or down relatively to each other. Said stirrup may be thus adjusted in the jaw end of the beam, either in concert with the side arms, F F, or independently of them, and to provide for the adjustment of the braces H H, which are attached at their inner ends to the stirrup, and to admit of the outer ends of the levers D D' being raised or lowered as may be required, the outer ends of said braces are adjustably connected with the levers—as, for instance, by a pair of jaws, J J, provided with a series of holes through which pins pass to unite the braces with the levers. This adjustment, in connection with the swivel attachment of the inner ends of the braces to the bottom of the stirrup, provides for every necessary movement of the braces.

The series of holes $s\ s$ in the looped straps G G, which admit of the fulcrum-pins $b\ b'$ being changed to occupy different positions in said straps, provide for either lever D D' being worked one in advance of the other, so as to cause the plow to take more or less land. For this purpose the bars C C′ should also have a series of holes in them for connecting them in a correspondingly adjustable manner with the draft cross-bar B.

The special application of this improved draft-equalizer to sulky-plows employing four horses abreast will be still better understood when it is remembered that the tongue or pole of such vehicles is always in a position to one side of the plow-beam, and that one horse walks in the previous furrow, the next horse on the opposite side of the tongue and usually in front of the plow-beam, and the other two horses farther out up on the land, but all having solid ground to walk upon.

When it is desired to attach the draft to the lower portion of the head of the plow-beam A, to secure the more shallow working of the plow in the ground, the stirrup I is placed between the jaws $i\ i$ in a position inverted from that above described, as shown in Fig. 4, and the braces H secured thereto and to the upper sets of fixed jaws J′ J′, room being thus afforded for the passage of the clevis-bolt through the lower holes in the jaw end of the plow-beam.

Having thus described my invention, I claim as new and desire to secure by Letters Patent—

1. The combination, with the plow-beam A, draft cross-bar B, connecting-bars C C′, and draft-equalizing levers D D′, of the adjustable side arms, F F, substantially as specified.

2. The pivoted loop E, in combination with the draft cross-bar B, the adjustable side arms, F F, and the plow-beam A, essentially as shown and described.

3. The pivoted loop E and draft cross-bar B, made adjustable up or down by a pin, $d$, and holes $e\ e$ in the side arms, F F, in combination with the plow-beam A, to which said side arms are adjustably attached, substantially as specified.

4. The plow-beam A, provided with a series of adjusting-apertures, $h$, in its jaw or forward end, in combination with the pivoted side arms, F F, the pin $g$, the looped straps G G, and the levers D D′, of different lengths, essentially as described.

5. The looped straps G G, provided with a series of adjusting-apertures, $s\ s$, in combination with the levers D D′, pivots $b\ b′$, fitting said apertures, the adjustable side arms, F F, and the plow-beam A, substantially as and for the purpose specified.

6. The adjustable stirrup I, in combination with the adjustable braces H H and the draft-equalizing levers D D′, essentially as herein set forth.

7. The combination of the draft-equalizing levers D D′, the looped straps G G, having adjusting-apertures for the fulcrums of said levers, the adjustable side bars, F F, the draft cross-bar B, adjustably attached to said levers, the connecting-bars C C′, the adjustable stirrup I, the adjustable braces H H, and the plow-beam A, substantially as specified.

DALLAS CARR.

Witnesses:
M. B. SCOTT,
WILLIAM L. WAY.